(12) United States Patent
Kapoor et al.

(10) Patent No.: US 7,584,204 B2
(45) Date of Patent: Sep. 1, 2009

(54) FUZZY LOOKUP TABLE MAINTENANCE

(75) Inventors: Rahul Kapoor, Bellevue, WA (US); Theodore Vassilakis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 11/150,389

(22) Filed: Jun. 10, 2005

(65) Prior Publication Data

US 2006/0282456 A1 Dec. 14, 2006

(51) Int. Cl.
*G06F 17/00* (2006.01)
(52) U.S. Cl. .................... 707/102; 707/8; 707/100; 707/101; 707/103 R; 707/204; 706/52; 706/900; 704/10
(58) Field of Classification Search ............... 707/101, 707/102, 8, 100, 103 R, 204; 706/52, 900; 704/10
See application file for complete search history.

(56) References Cited

U.S. PATENT DOCUMENTS

| | | | | |
|---|---|---|---|---|
| 5,133,068 A | * | 7/1992 | Crus et al. ................... | 707/100 |
| 6,122,640 A | * | 9/2000 | Pereira ..................... | 707/103 R |
| 6,578,038 B1 | * | 6/2003 | Haegele ...................... | 707/100 |
| 7,149,695 B1 | * | 12/2006 | Bellegarda ................... | 704/275 |
| 7,415,467 B2 | * | 8/2008 | Jeevanjee et al. ................ | 707/8 |
| 2003/0114211 A1 | * | 6/2003 | White .......................... | 463/17 |
| 2003/0126139 A1 | * | 7/2003 | Lee et al. ..................... | 707/100 |
| 2004/0122656 A1 | * | 6/2004 | Abir ............................... | 704/4 |
| 2004/0139070 A1 | * | 7/2004 | Dysart et al. .................... | 707/3 |
| 2004/0249870 A1 | * | 12/2004 | Jeevanjee et al. ............ | 707/204 |
| 2004/0260694 A1 | * | 12/2004 | Chaudhuri et al. ............. | 707/5 |
| 2005/0027574 A1 | * | 2/2005 | Agrawal et al. ................ | 705/7 |

OTHER PUBLICATIONS

Sybase SQL Server Reference Manual, vol. 1 and vol. 2, 1996.*
Chaudhuri et al.; "Robust and Efficient Fuzzy Match for Online Data Cleaning"; SIGMOD 2003, Jun. 9-12, 2003, San Diego, CA; 12 pages.
Ananthakrishna et al.; "Eliminating Fuzzy Duplicates in Data Warehouses"; 12 pages, date: 2002.

* cited by examiner

*Primary Examiner*—Jean B. Fleurantin
*Assistant Examiner*—Phong Nguyen
(74) *Attorney, Agent, or Firm*—Lee & Hayes, PLLC (57) ABSTRACT

An exemplary computer-implementable method includes providing a trigger that executes a script upon receipt of change information for changing reference information or an instruction associated with change information for changing reference information, in response to execution of the script, allocating memory for processing the change information and based on the processing of the change information, building an index associated with a fuzzy lookup service. Various other exemplary methods, devices, systems, etc., are also disclosed.

15 Claims, 9 Drawing Sheets

EXEMPLARY METHOD
400

EXEMPLARY ADAPTIVE BUFFERING METHOD
800

Fig. 8

FUZZY LOOKUP TABLE MAINTENANCE

BACKGROUND

Fuzzy lookup or fuzzy matching technologies allow use of "dirty" information to locate accurate information or vice versa. Such technologies commonly rely on specific algorithms that require various operations. A typical use of a fuzzy lookup service involves user input of information and search of reference information for matching information. Fuzzy generally refers to a type of logic that is based on "degrees of truth" rather than the usual "true or false" (1 or 0) Boolean logic.

As discussed in more detail below, a particular fuzzy lookup algorithm relies on an index wherein, prior to or coincident with lookup, the index needs to be built, which can take considerable time and resources. Thus, an opportunity exists for techniques to manage or maintain such an index. Further, other components of a fuzzy lookup service can benefit from management or maintenance. Various exemplary technologies disclosed herein address management and maintenance of components associated with fuzzy lookup services.

SUMMARY

A method includes use of a trigger that executes a script upon receipt of a request to change information in a database. Execution of the script builds an index associated with a fuzzy lookup service. The extent of the build can depend on various factors. The build can occur incrementally on, for example, a change-by-change basis, to thereby avoid an entire build of an index. Execution of the script can also allocate memory for processing the change and building the index, to the extent appropriate. Various other exemplary methods, devices, systems, etc., are also disclosed.

BRIEF DESCRIPTION OF THE DRAWINGS

Non-limiting and non-exhaustive examples are described with reference to the following figures, wherein like reference numerals generally refer to like parts throughout the various views unless otherwise specified.

DETAILED DESCRIPTION

Various exemplary technologies disclosed herein pertain to maintenance of data services related components. For example, a fuzzy match or fuzzy lookup data service allows for the retrieval of information from a reference relation (e.g., a SQL server table) using potentially incomplete or corrupt keys. Such a service relies on a component known as an error tolerant index (ETI), which may be stored on an SQL Server as an ordinary table. An ETI generally contains information about a reference table.

Various exemplary maintenance technologies provide for maintenance of such a component. For example, an exemplary method maintains an ETI in response to modifications to an underlying reference table. Such an exemplary method optionally allows for server-side maintenance of an ETI independently of client-side use of a fuzzy lookup service. In such an example, if a user updates, inserts or deletes one or more references of a reference table, the exemplary maintenance method may perform corresponding updates, insertions or deletions of the ETI automatically and in a manner transparent to the user.

A brief overview of fuzzy lookup technology is presented followed by an example of a particular fuzzy lookup implementation and examples of exemplary technologies for maintaining various components related to fuzzy lookup.

Fuzzy lookup has many uses such as, but not limited to, data cleaning. An article by Chaudhuri et al., entitled "Robust and Efficient Fuzzy Match for Online Data Cleaning" (SIGMOD 2003, Jun. 9-12, 2003, San Diego, Calif.) describes some basics of fuzzy lookup for data cleaning. Data cleaning aims to ensure high data quality in situations where deletion, input or modification of data "tuples" occur. A tuple is a term from set theory which refers to a collection of one or more attributes. Often, clean tuples must match acceptable tuples in one or more reference tables. For example, product name and description fields in a sales record from a distributor must match the pre-recorded name and description fields in a product reference relation.

As explained by Chaudhuri et al., a significant challenge exists in implementing an efficient and accurate fuzzy lookup operation that can effectively clean an incoming tuple if it fails to match exactly with any tuple in a given reference relation. In addressing this challenge, Chaudhuri et al. propose a similarity function and develop an efficient fuzzy lookup algorithm.

Figure 1:
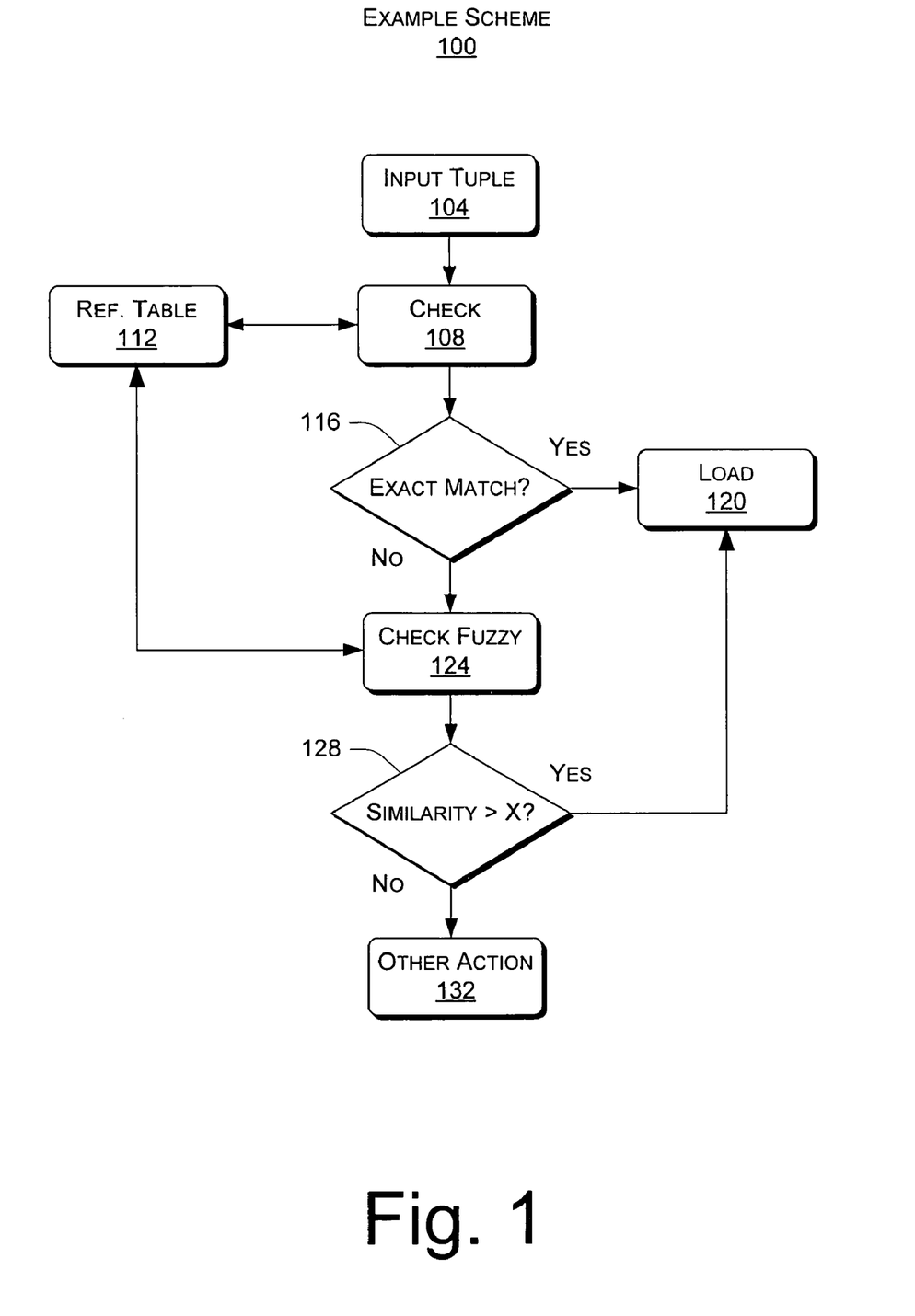
FIG. 1 is a diagram of a scheme for fuzzy lookup.

As aspects of a similarity function and a fuzzy lookup algorithm aid in explanation of various exemplary maintenance technologies, a particular example presented in Chaudhuri et al. is essentially reproduced herein as FIG. 1 as example scheme 100.

In example scheme 100, an input block 104 provides a tuple. A check block 108 performs a check procedure for the provided tuple in which the check procedure relies on a reference table 112 (sometimes identified as "R" herein). A decision block 116 follows that decides if an exact match exists for the provided tuple with respect to the reference table 108. If the decision block 116 decides that an exact match exists, then the example scheme 100 continues in a load block 120, which may load information into memory or provide notification of the match. However, if an exact match does not exist, then the example scheme 100 continues in a fuzzy check block 124 that relies on the reference table 112. Another decision block 128 follows that uses a fuzzy match algorithm that relies on a similarity measure and a predetermined similarity limit "X" (e.g., typically a fraction). In particular, the decision block 128 decides if the similarity measure is greater than the similarity limit X. If this condition is met, then the example scheme 100 continues to the load block 120, as described above. However, if the condition is not met, then other action may occur per another action block 132.

Consider an example where an enterprise wishes to ascertain whether or not a sales record describes an existing customer by fuzzily matching the customer attributes of the sales record against a given "Customer" reference relation where the reference relation, Customer, contains tuples describing all current customers. If a fuzzy lookup procedure returns a target customer tuple that is either equal or "reasonably close" to the input customer tuple then the input tuple will have been validated or possibly corrected. The notion of closeness between tuples is usually measured by a similarity function.

Referring again to the decision block 128, if the similarity condition is not met, then the other action block 132 occurs, which may route the input tuple for further cleaning, considering it as referring to a new customer or further cleaning before considering it as referring to a new customer. Importantly, a fuzzy lookup procedure operation that is resilient to input errors can effectively prevent the proliferation of fuzzy duplicates in a relation, i.e., multiple tuples describing the same real world entity.

A particular goal of a fuzzy lookup algorithm is to efficiently retrieve one or more reference tuples closest to an input tuple (e.g., consider "nearest neighbors"). Chaudhuri et al. propose a probabilistic approach where the goal is to return the closest N reference tuples with "high" probability. This approach relies on pre-processing the reference relation to build an index relation, called the error tolerant index (ETI) relation, for retrieving at run time a small set of candidate reference tuples, which are then compared with the input tuple.

Chaudhuri et al. implement the index relation ETI as a standard relation to allow for deployment even over current operational data warehouses. The primary purpose of ETI is to enable, for each input tuple, the efficient retrieval of a candidate set N of reference tuples whose similarity with the input tuple is greater than a minimum similarity threshold X. The procedure involves identification comparing min-hash signatures of tokens, a set of reference tuples sharing min-hash q-grams with that of each token. Consider an example input tuple [Beoing Company, Seattle, Wash., 98004]:

| Beoing | → | [eoi, ing] | → | N1, N2 |
| Company | → | [com, pan] | → | N3, N4 |
| Seattle | → | [sea, ttl] | → | N5, N6 |
| WA | → | [wa] | → | N7 |
| 98004 | → | [980, 004] | → | N8, N9 |

The leftmost column lists tokens in the input tuple. For example, a tokenization function may act upon an input tuple to create tokens (e.g., the string "Beoing Company" is tokenized to tokens "Beoing" and "Company"). The center column lists q-gram signatures of each token and the rightmost column lists sets (N1 through N9) of tids of reference tuples with tokens whose min-hash signatures contain the corresponding q-gram. For example, the set N1 U N2 is the set of tids of reference tuples containing a token in an organization name column that shares a min-hash q-gram with 'beoing'. Extending this behavior to q-gram signatures of all tokens, the union of all N1-N9 contains the candidate set N. In order to identify such sets of tids, in ETI each q-gram is stored along with the list of all tids of reference tuples with tokens whose min-hash signatures contain a string.

Chaudhuri et al. describe a particular ETI with a schema [QGram, Coordinate, Column, Frequency, Tid-list] where building occurs leveraging an underlying database system that first build a temporary relation called the pre-ETI with sufficient information and then construct the ETI relation from the pre-ETI using SQL queries.

Chaudhuri et al. mention that in instance of fuzzy lookup for more than 10 input tuples, it is advantageous to build the ETI. Further, they mention that the ETI may be persisted as a standard indexed relation and used for subsequent batches of input tuples if the reference table does not change. However, they do not mention maintenance of the ETI in instances where the reference table changes. Various exemplary technologies presented herein address such maintenance and other issues germane to fuzzy lookup.

Figure 2:
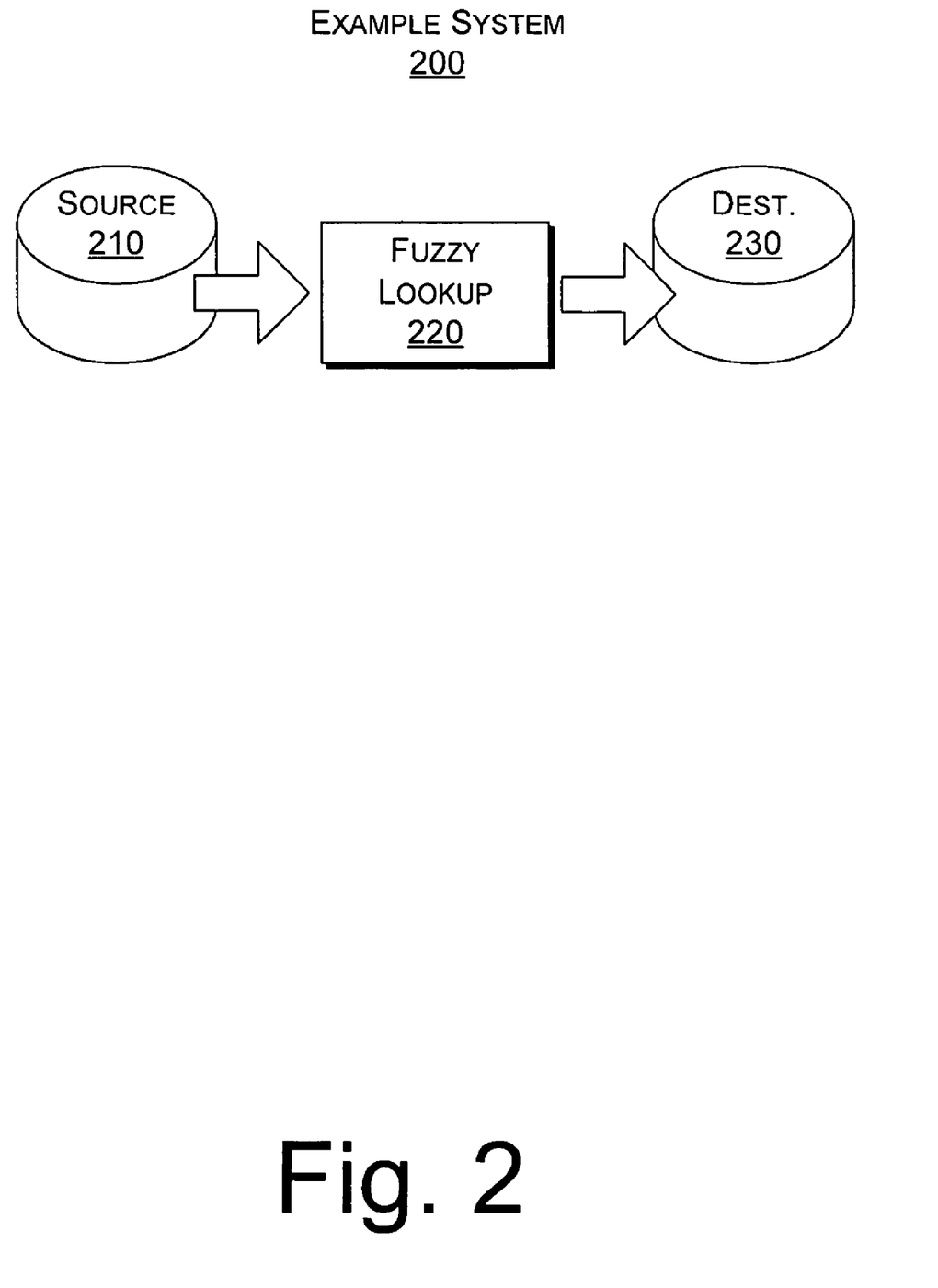
FIG. 2 is a diagram of an example system that includes a fuzzy lookup service.

As already inferred, fuzzy lookup can find data in large tables using a corrupt or incomplete string key (e.g., Beoing Company instead of Boeing Company). FIG. 2 shows an example of an implementation of fuzzy lookup 200. This example includes a source 210, a fuzzy lookup data service 220 and a destination 230. The procedure may occur as a single data transformation service data flow task. Data transformation services (DTS) are a set of services that pertain generally to importing and exporting data from a SQL server that offer heterogeneous data movement, validation, and a transaction based workflow engine. The Microsoft® SQL Server™ is a relational database management and analysis system for e-commerce, line-of-business, data warehousing solutions, etc., that includes DTS. Various exemplary technologies discussed herein may optionally be implemented in such a system.

The Microsoft® SQL Server™ software includes a fuzzy lookup service. A DTS designer allows for project creation and creation of data flow tasks. For example, a user may use the designer to drag OLE DB source and destination transforms from a toolbox and then connect them by using an instance of a fuzzy lookup service. A user may point the OLE DB source at new data by selecting a connection and an input table that contains the "dirty" data (i.e., data that may not provide for "exact" matches) that contains some string columns. The user may then select the fuzzy lookup service to open a user interface that allows for selection of a connection and a table to which the transform to warehoused reference data will point. A columns tab allows a user to drag items for comparison from available input columns (e.g., from the OLE DB source) to available lookup columns (e.g., from the reference table), for example, to compare StreetAddress in an input with Address in a reference table. Thereafter, the user may point the OLE DB destination to a connection for which a new table may be written. A default creation statement may be accepted and the fuzzy lookup service executed.

As already mentioned, an ETI must be built or otherwise available as it is a data structure used by the Microsoft® SQL Server™ fuzzy lookup service at runtime. In instances where an ETI must be built prior to fuzzy lookup, a delay may occur. After the ETI is built, all the input rows are processed and the results are written to the destination.

The Microsoft® SQL Server™ DTS designer application provides feedback about the progress of the pipeline by displaying the number of rows processed by each component. A "DataViewer" may be placed on the pipeline, for example, by right-clicking the connector between the fuzzy lookup transform object and the OLE DB destination. The viewer allows a user to visualize in real-time which rows the fuzzy lookup service has matched to input rows. In addition to matching tuples, the fuzzy lookup service outputs confidence and similarity scores.

In the aforementioned example where a Microsoft® SQL Server™ fuzzy lookup service is used, stages include building the ETI, performing the lookup, and examining the output. The fuzzy lookup service builds the ETI by indexing the tokens that occur in the reference data and the reference row IDs. In the Microsoft® SQL Server™ fuzzy lookup service each row includes an indexed token and a sequence of reference row IDs that contain the token. If reference data contains 13831 N.E. 8th St, the ETI may include token entries for 13831, N, E, 8th, and St. Thus, the ETI grows with the reference data: the more unique tokens and the more rows in the reference table, the more entries and longer lists in the ETI. The tokenization process is controlled by the fuzzy lookup service custom property delimiter string. For example, to index N.E. instead of N and E, a user would remove the period from the list of delimiters. As a consequence, N.E. appears as a single token in the ETI and will be looked up as a unit at run time. Because delimiters are applied globally, First.Avenue, for example, also appears as a single token.

With respect to specifics of matching, criteria may include the number of token or character insertions, deletions, substitutions, and re-orderings that need to be made to the input tuple to match a given reference tuple. For example, the input 122 First Lane will likely be considered closer to the reference 122 First Ln than the input 22 N.E. 1st Ln & Leary Way. Token frequencies from a reference table may also be used where highly frequent tokens are generally considered to give little information about quality of a match, whereas, relatively rare tokens may be considered characteristic of the row in which they occur.

A user may have the option of setting the threshold or similarity limit, for example, depending on the nature of the application or data. Where close matches are required between inputs and reference, a high value for a minimum similarity may be around 0.95 (e.g., MinSimilarity parameter). An exploratory project where weak matches are of use, a lower value of about 0.1 may be considered. Another parameter allows a user to view more than a single match for each input, where appropriate. A fuzzy lookup service may return a confidence measure for each matching reference record. If all the matches are equally close, the confidence score is roughly equal to 1/n for each of the "matches". For the Microsoft® SQL Server™ fuzzy lookup service, confidence differs from similarity in that it is not only a function of the input row and the reference row that it qualifies; it depends on the entire set of results returned, and possibly also on the next best available reference row.

While various features of the Microsoft® SQL Server™ fuzzy lookup service have been discussed, a significant concern pertains to ETI construction as it becomes more expensive as the reference data grows in size. Some options exist to address this concern, for example, the Microsoft® SQL Server™ fuzzy lookup service offers an option of storing an ETI on the server and re-using it at a later date to avoid re-building an ETI every time the fuzzy lookup service runs. Further, if an ETI takes too long to re-build for every run, a user may consider creating it once and re-using it in subsequent runs by storing the ETI as a table for a given a table name. With respect to ETI size, planning for server space may be necessary. In a worst case scenario for the Microsoft® SQL Server™ fuzzy lookup service, the ETI may be as large as twice the size of the data in the indexed rows of the reference table.

Thus, as discussed above, the fuzzy lookup probabilistic approaches of the Microsoft® SQL Server™ fuzzy lookup service and Chaudhuri et al. rely on an index that can be significant in size and, hence, memory requirements and that may require rebuilding when changes (e.g., deletions, insertions or modifications) occur. Various exemplary technologies disclosed herein pertain to maintenance of such an index where changes occur.

An exemplary method installs an exemplary trigger on an index (e.g., ETI) that detects changes to underlying reference data. When such changes occur, the exemplary trigger acts to propagate appropriate changes to the index to keep it up-to-date. Such an exemplary method can decouple index building from run time. For example, an exemplary trigger executes upon detection of a change in data or a command to change data to cause building of an index. Accordingly, the index is available at run time of a fuzzy lookup service, i.e., index building need not occur at run time of the fuzzy lookup service. Such an exemplary method allows for more efficient lookup and management or maintenance of data.

The Microsoft® SQL Server™ software supports using triggers as a kind of stored procedure. Triggers can be executed when a specified data change, such as an attempt to delete a row, is attempted on the table on which the trigger is defined. A trigger object can create a server trigger on an existing table, remove an existing server trigger from a table, generate a Transact-SQL script to use in other tools to recreate an existing server trigger, change ownership of an existing server trigger, etc. As described herein an exemplary trigger may rely on a Transact-SQL script (T-SQL) and thus be referred to as a T-SQL trigger. The Microsoft® SQL Server™ software allows for trigger creation where a trigger is a stored procedure that can execute automatically when a user attempts a specified data-modification statement on a specified table. The Microsoft® SQL Server™ software allows the creation of multiple triggers for any given INSERT, UPDATE, or DELETE statement.

Microsoft® SQL Server™ 2005 software has extended traditional triggers and enabled triggers to be fired for DDL operations like CREATE, ALTER, and DROP. These triggers are created, altered, and dropped using similar Transact-SQL syntax as that for standard triggers. DDL triggers apply to all commands of a single type across a database or server and they execute only after completion of a DDL statement (although they can roll back the transaction to before the execution of the DDL statement that caused their triggering). DDL triggers help to enforce development rules and standards for objects in a database; protect from accidental drops; help in object check-in/checkout, source versioning, and log management activities. An exemplary trigger for maintenance of an index for fuzzy lookup optionally allows for roll back of a transaction.

Figure 3:
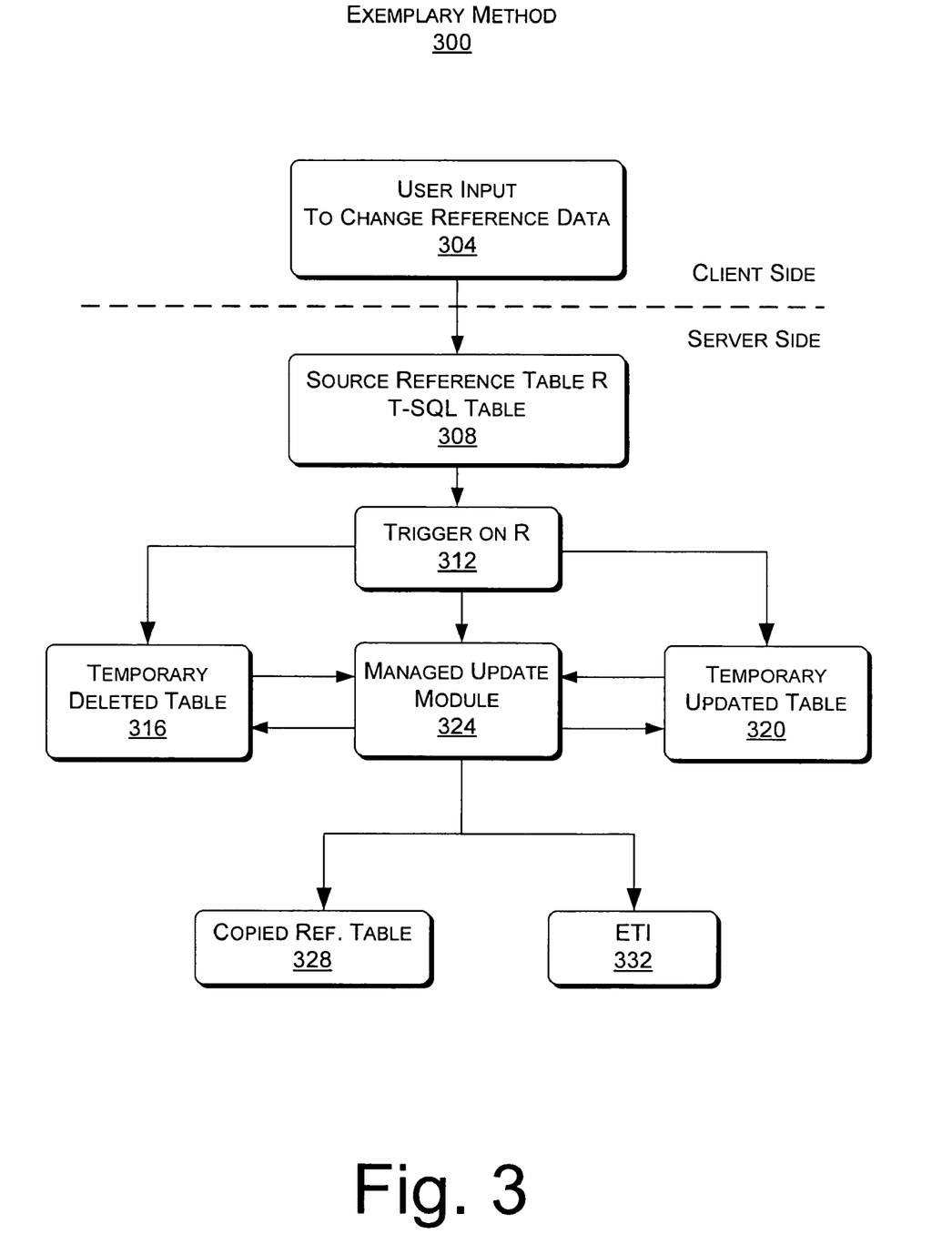
FIG. 3 is a diagram of an exemplary method for maintaining various components of a fuzzy lookup service in a client-server environment.

FIG. 3 shows an exemplary method 300 that relies on an exemplary trigger for building an index upon a change to reference data. An input block 304 provides change information for a change to reference data. In this example, the input occurs on a client side of a client-server system and the server side receives the change information. The server side includes a source reference table "R" and a T-SQL table block 308. A trigger block 312 acts in response to the input of change information. For example, the change information is typically associated with commands or instructions such as delete, modify or insert, which can cause the exemplary trigger to act. The trigger is optionally a T-SQL trigger with script to cause for actions generally related to maintenance of one or more fuzzy lookup service components.

The trigger of the exemplary method 300 acts to notify changes to a reference table and to maintain various components of a fuzzy lookup service. In particular, the trigger acts to allocate memory for a temporary "deleted" table 316 and a temporary "updated" table 320 and invokes a managed update module 324 that relies on the temporary tables 316, 320 to create a copied reference table 328 and to build an index, for example, an ETI 332, which may be a table. The trigger may act to define and initiate a transaction. For example, various procedures performed by the managed update module 324 may be part of a transaction that can be optionally rolled back should such a need occur.

The managed update module 324 operates in conjunction with the deleted table 316 to receive newly deleted data changes and to delete processed rows and operates in conjunction with the inserted table 320 to receive newly inserted data changes and to delete processed rows. These operations, as appropriate and required, allow the managed update module 324 to create the copied reference table 328 (sometimes referred to as "RC") and the index 332 (e.g., an ETI).

While the exemplary method 300 is shown as being implemented in a client-server system, such an exemplary method may optionally be implemented on a server or in other instances on a client (e.g., where the client has required reference data or other data). For example, in the server side implementation, a server administrator may request changes to reference data and perform all operations on the server without aid of a client. In the client side implementation, a client may download all data from a server or other source and then perform the maintenance operations. In either instance, results may be checked prior to acceptance. For example, a user may perform a fuzzy lookup that pertains to the change information and, based on the results, the user may decide whether the copied reference table or the index were properly or adequately created or built, respectively.

Figure 4:
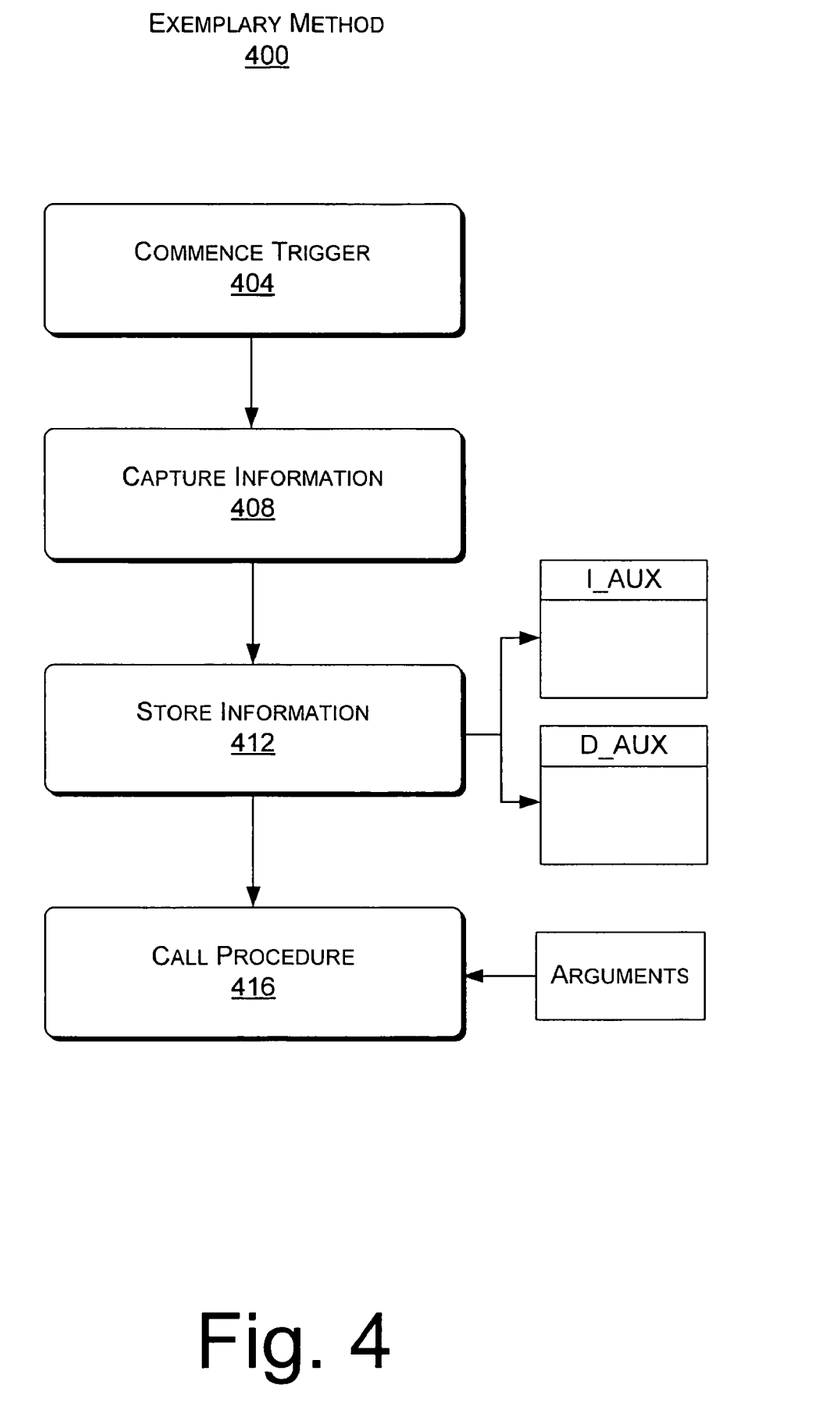
FIG. 4 is a diagram of an exemplary method commenced through use of an exemplary trigger.

FIG. 4 shows an exemplary method 400 that pertains to an exemplary trigger. A commence trigger block 404 commences a trigger as appropriate, for example, upon detection of a command or instruction associated with change information. A capture block 408 acts to capture change information. The capture block 408 may be invoked using a script (e.g., T-SQL trigger script). In the example of FIG. 4, the capture block 408 captures modification, insertions, and deletions to a reference table R. A storage block 412 follows wherein the change information is stored in a deletion table D_AUX and an insertion table I_AUX. The change information may be stored in these tables as single row events or multiple rows change events.

Per a call block 416, the trigger of the exemplary method 400 then calls or invokes a stored procedure (e.g., Sys.FuzzyLookupTableMaintenanceInvoke) with various arguments. The arguments may be the names of staging tables and an index (e.g., ETI), R pairs to maintain, etc. An exemplary procedure is described with reference to FIG. 5.

Figure 5:
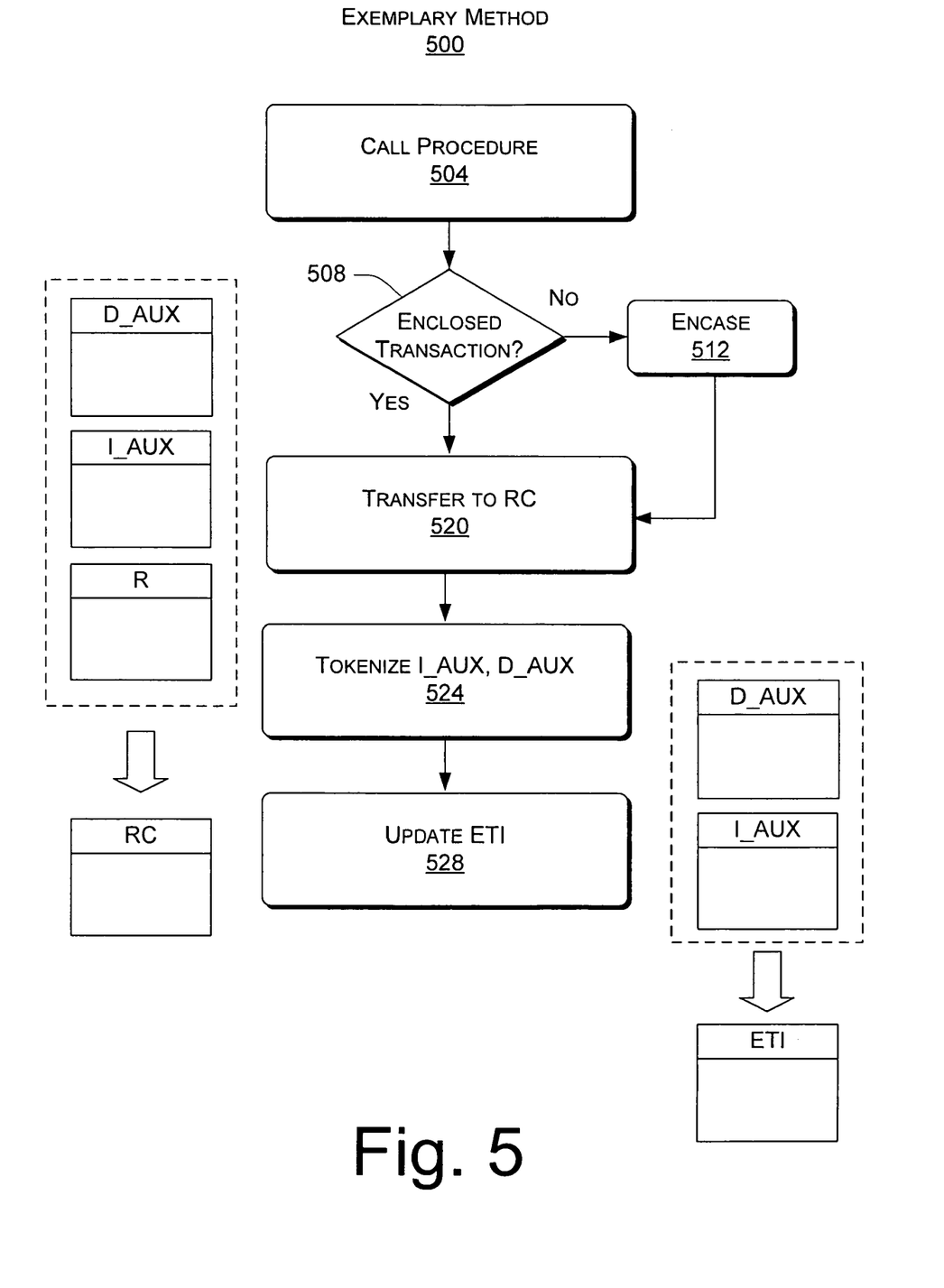
FIG. 5 is a diagram of an exemplary method for updating an index associated with a fuzzy lookup service.

FIG. 5 shows an exemplary method 500 that may be the exemplary procedure called or invoked by the call block 416 of FIG. 4. The exemplary method 500 commences in a call block 504 (see, e.g., the call block 416 of FIG. 4). A decision block 508 follows that decides if the call indicates or otherwise includes an enclosed transaction. For example, as already mentioned, a transaction may allow for actions to be committed or rolled back to help ensure data integrity. If the decision block 508 decides that no enclosing transaction exists, then in an encase block 512, the exemplary method 500 initiates a maintenance transaction to allow actions to be committed or rolled back and continues to a transfer block 520. If the decision block 508 decides that an enclosed transaction exists, then the method 500 also continues to the transfer block 520.

The transfer block 520 acts to transfer information to a copied reference table RC. The transfer procedure relies on, for example, the aforementioned tables I_AUX and D_AUX and the reference table R to create the copied reference table RC. Then, in a tokenization block 524, the exemplary method 500 then tokenizes each row in the tables I_AUX and D_AUX, as necessary (e.g., if no deletions exist then a need for a deletion table may not exist). An update or build block 528 then updates or builds an index (e.g., ETI) based on insertions, deletions, modifications contained in I_AUX, D_AUX.

Again, as already mentioned, the exemplary methods 400 and 500 of FIGS. 4 and 5, respectively, may occur at times other than run time of a fuzzy lookup. Thus, the maintenance of a reference table and an index are decoupled from run time. This can allow a user to perform a fuzzy lookup more efficiently because the reference table and the index should be current. For example, prior to such exemplary methods, the fuzzy lookup may return questionable results or a check need occur prior to the fuzzy lookup to ensure that all change information is reflected in the current reference table and associated fuzzy lookup index. Building an index can take considerable amount of time. Thus, where a current index is required, production of fuzzy lookup results would be delayed. Various exemplary methods disclosed herein can help to ensure that a reference table and an associated index are current by responding to change information or commands or instructions associated with change information. Of course, in the situation where a user inputs change information and requests a fuzzy lookup, the user must incur any delay required for building an index, assuming the change information is germane to the requested fuzzy lookup.

Figure 6:
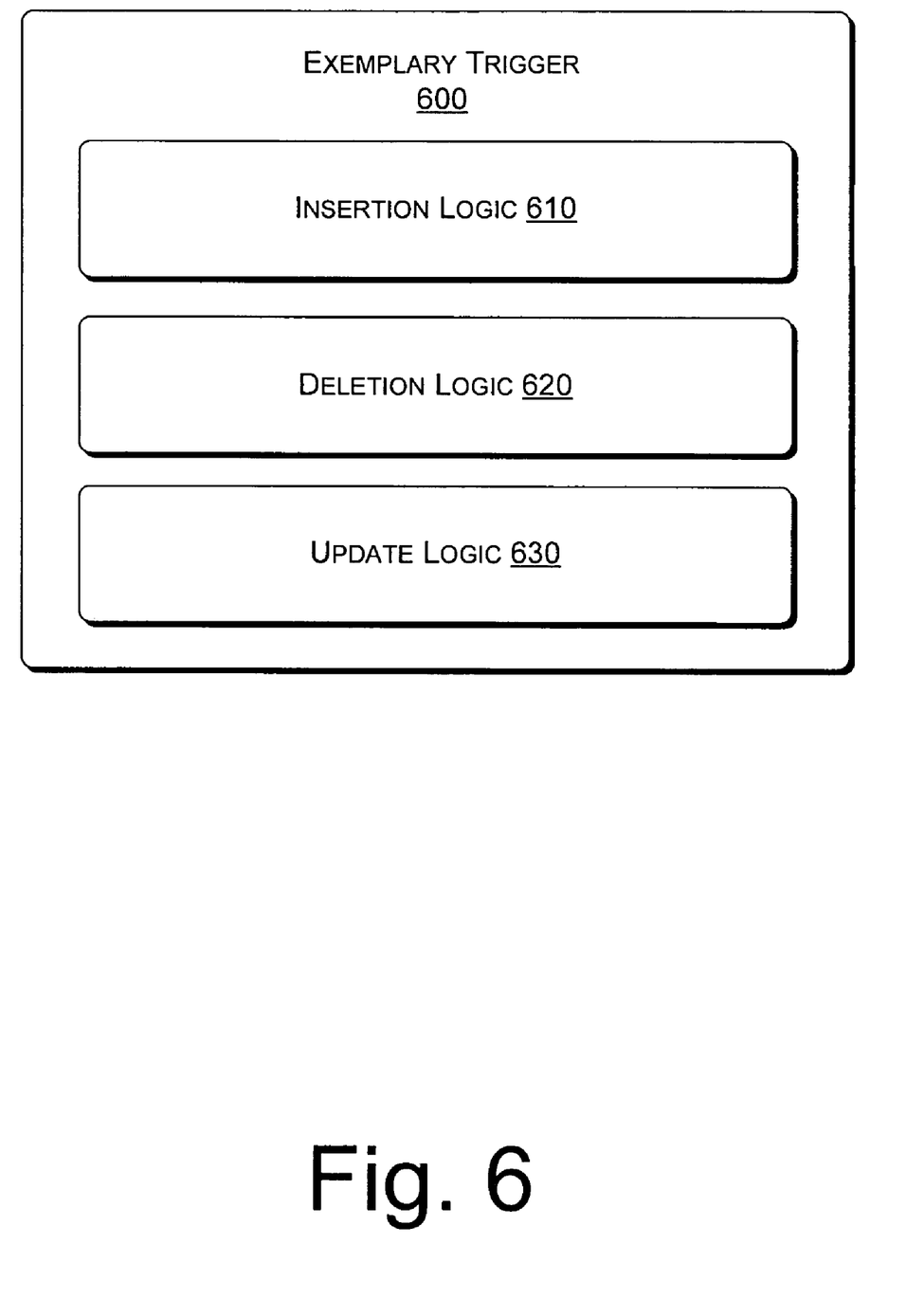
FIG. 6 is a diagram of an exemplary trigger that includes various logic modules for performing operations germane to a fuzzy lookup service (e.g., maintenance of an index).

FIG. 6 shows an exemplary trigger 600 that includes various logic, for example, insertion logic 610, deletion logic 620 and update logic 630. Such an exemplary trigger may be installed as a T-SQL trigger on a reference table. The insertion logic 610 includes logic to insert new rows from R into RC, to extract row identifiers (rids) of newly inserted rows into an auxiliary table I_AUX and to invoke a managed update module (e.g., the module 324 of FIG. 3) to perform index (e.g., ETI) maintenance. The deletion logic 620 includes logic to select rows from an RC that match the rows to be deleted and to store rids for such rows in an auxiliary table D_AUX and to invoke a managed update module to perform index maintenance. Because the reference table R may contain duplicate rows, the selection logic may require selection based on equality of all columns in the reference table R. In the event that R has multiple columns whose expected size exceeds some particular size (e.g., 16 bytes), an exemplary module may elect to insert a hash column in the copied reference table RC to speed up lookup where the hash column may include a standard hash of all the data in a row.

The update logic 630 of the exemplary trigger 600 includes logic to treat updates in, for example, two different ways depending on user settings. In a "simple" setting, the logic treats an update as a delete followed by an insert and performs insertion logic 610 and deletion logic 620, as discussed above. In an SQL server environment, this approach results in having different rids for the updated rows because identity columns auto-increment on an insertion. In a more complex setting, the logic maintains the same rid for the update, which is achieved by tracking which rid was updated and inserting that rid into I_AUX and D_AUX.

Figure 7:
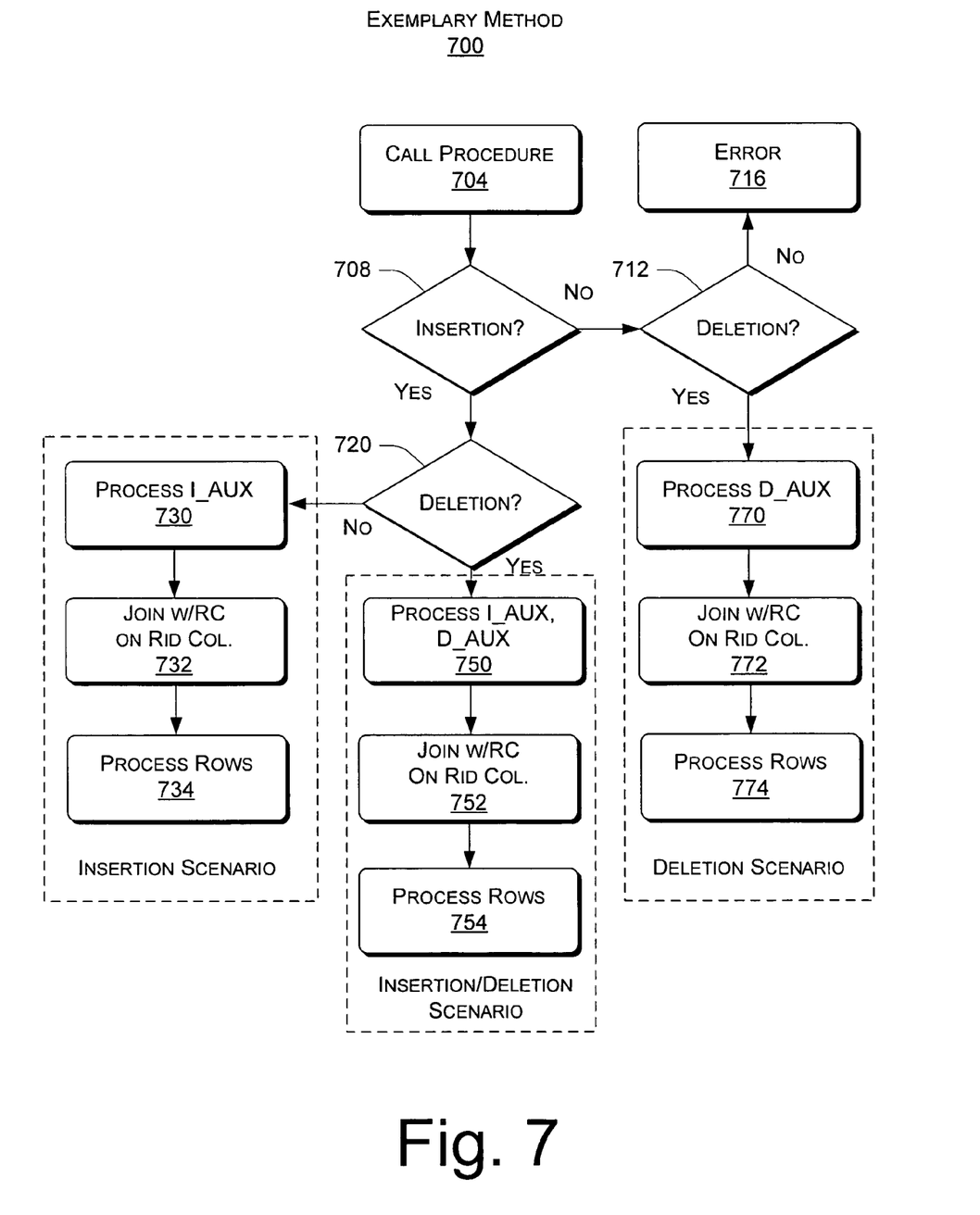
FIG. 7 is a diagram of an exemplary method for discerning scenarios based on change information or commands or instructions associated with change information.

FIG. 7 shows an exemplary method 700 that provides for various scenarios, in particular, an insertion scenario, an insertion/deletion scenario and a deletion scenario. A call block 704 calls a procedure germane to change information for a reference table. A decision block 708 decides if the call calls for insertions while two other decision blocks 712, 720 decide if the call calls for deletions. Of course, other logic may be used to decide which scenario is appropriate. In the instance that neither deletions or insertions are called for, then the exemplary method 700 enters an error block 716 that may cause appropriate action (e.g., notify user of error).

For the insertion scenario, a process block 730 processes information for an auxiliary table I_AUX. A join block 732 joins the processed information of the table I_AUX with a copied reference table RC on a rid column. Next, a processing block 734 processes the resulting rows. The procedures for the other scenarios are similar. The insertion/deletion scenario includes a process block 750 for processing information for an auxiliary table I_AUX and an auxiliary table D_AUX, a join block 752 for joining the processed information with a copied reference table RC on a rid column and a process block 754 to process the resulting rows. The deletion scenario includes a process block 770 for processing information for an auxiliary table D_AUX, a join block 772 for joining the processed information with a copied reference table RC on a rid column and a process block 774 to process the resulting rows. These scenarios optionally rely on the logic of the exemplary trigger 600 of FIG. 6 or other logic.

While inherent to the exemplary method 700 of FIG. 7, memory is required and, hence, an opportunity exists for management of memory. This is particularly advantageous in instances where memory requirements for maintaining a reference table and an index may be significant and potentially cause an out of memory (OOM) error.

Figure 8:
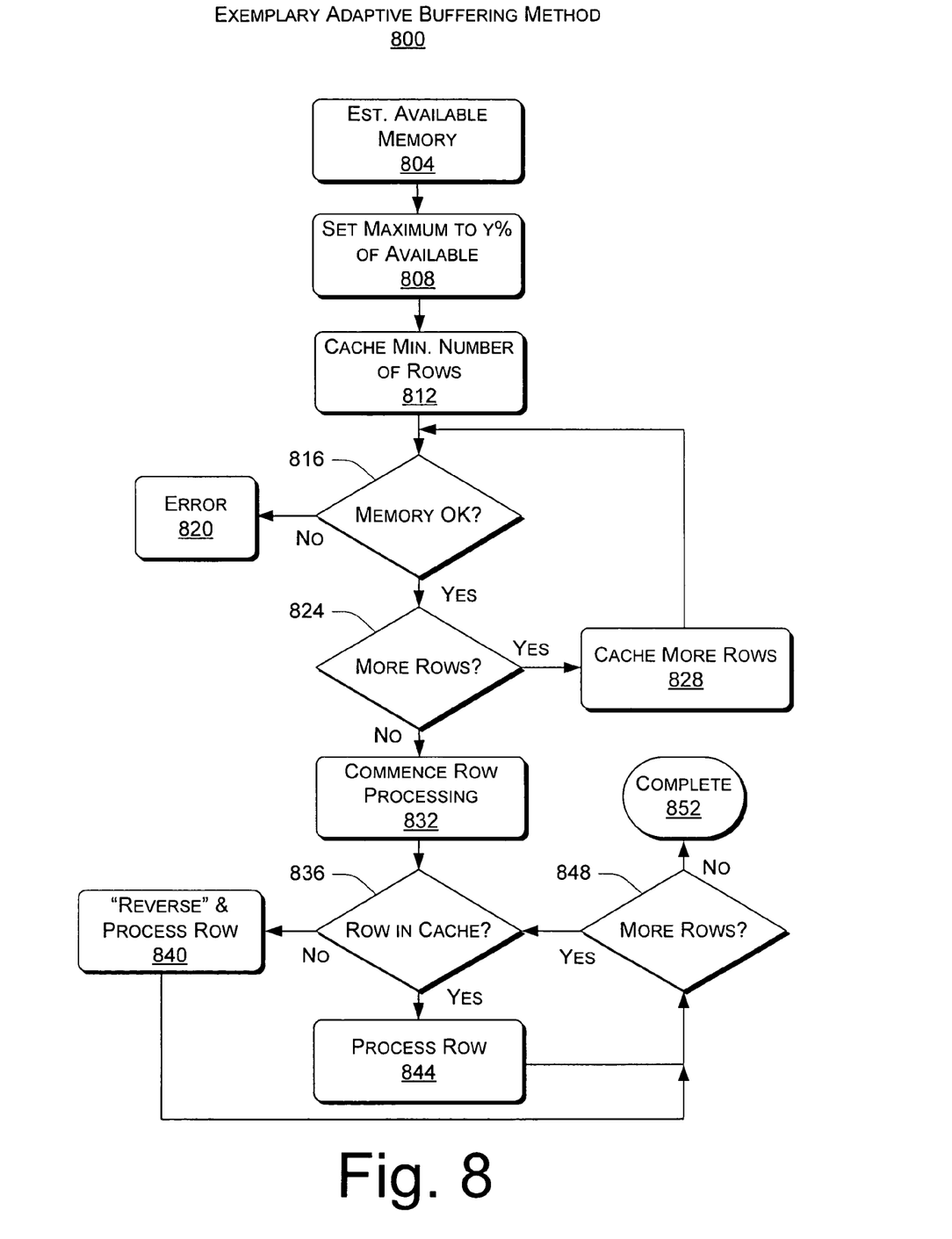
FIG. 8 is a diagram of an exemplary method for adaptive buffering implemented for maintaining one or more components associated with a fuzzy lookup service.

FIG. 8 shows an exemplary method 800 for adaptive buffering. The exemplary method 800 commences in an estimation block 804 that estimates available memory. A set block 808 follows that sets a parameter for maximum memory usage to a fraction of the estimated available memory (e.g., shown as a percentage "Y"). The method 800 continues in a cache block 812 that caches a minimum number of rows. A decision block 816 follows or occurs concurrent with the caching to decide if memory is being adequately managed. If the decision block 816 decides that memory conditions have changed or otherwise at risk of causes an error, then an error block 820 causes issuance of an error or other notification. If the decision block 816 decides that memory is OK, then another decision block 824 decides if more rows need be cached. If more rows need to be cached, then a cache block 828 causes such caching and the method 800 returns to the decision block 816. If the instance that the decision block 824 decides that no more rows require caching, then the method 800 enters a commencement block 832 to commence processing of the cached rows.

For processing of cached rows, a decision block 836 decides if a row is in the cache. If a row is not in the cache, then a reverse block 840 reverses or backs up to process the particular row individually. The method 800 then proceeds to a decision block 848 to decide if more rows exist for processing. Referring again to the decision block 836, if a row is in the cache, then a processing block 844 processes the row and continues to the decision block 848. Thus, the row processing of the exemplary method 800 continues to process rows until all rows are processed thereby ending in a completion block 852.

An exemplary caching process can cache input rows and updates for an index (e.g., ETI) in an effort to improve performance on top of any caching that may be performed by, for example, a server. In such a process, a large operation may be process input rows by selecting and using a fixed number of tuples for use in reading ahead. Further, the number may be increased on every read.

For updates to an index (e.g., ETI), for every bucket of changes, the entire bucket is loaded in memory whereby updates may be subsequent performed on the bucket while it resides in memory. In general, for SQL/CLR, out-of memory errors ("OOM errors") are fatal; thus, such errors should be avoided through memory management. In the instance that such an error occurs or other error, an exemplary method allows for rolling back of an entire transaction.

With respect to avoiding OOM errors, an exemplary method can monitor resources (e.g., server memory) and in response to a memory pressure signal (e.g., memory below a certain level, memory below a certain percentage, etc.), operations such as flushing of index updates may occur or reduction of reading ahead block size may occur (e.g., halving read-ahead of tuples to process).

An exemplary method may also hold weak references to the input tuples to reduce the risk of an OOM error. Such an approach can allow a runtime garbage collection to collect the input tuples as stored and thereby relieve memory pressure. However, when using such tuples, an attempt can occur to convert the weak references to ordinary references. If such an attempt fails, then the data is read again into memory. Such a process is not desirable for updates to an index (consider, e.g., the bucket(s)) because the cost associated with losing such data before flushing can be substantial.

In an exemplary method for maintaining a fuzzy lookup reference table and an associated index, normalization and tokenization occur as in a fuzzy lookup. In this example, the exemplary method may use SQL server facilities to call out to a base operating system for native services and it may also employ min-hashing. In general, the exemplary maintenance method reads normalization settings (such as 'all lower case') from metadata embedded in an index (e.g., ETI) by a fuzzy lookup service. For each resulting token, the exemplary maintenance method updates the corresponding index bucket by reading data from the index, inserting or deleting the rid in the rid-list data structure, and writing the data back to SQL server.

As already mentioned, server memory pressure conditions may exist. Various exemplary methods act to minimize memory requirements and thus reduce risk of an OOM abort. However, if a server indicates that some memory is available, an exemplary maintenance method may attempt to cache data to minimize communication with the server and avoid I/Os. For example, consider the caching operations of the exemplary method 800 of FIG. 8. Such operations can decrease time requirements.

An exemplary method may provide for accumulation of tokens of multiple rows may occur in memory. For example, it may process several rows in sequence calling for the insertion of identical tokens: 1 'bob'; 4 'bob' and 12 'bob'. In this example, the exemplary method tracks that the token 'bob' has occurred and that the rids 1, 4, 12 must be added to the index (e.g., ETI). When a certain buffering threshold is reached, the exemplary method fetches an index bucket for 'bob' and performs the insertion of 1, 4, 12 in the rid-list in, for example, a single scan and copy operation. If at this point, memory conditions are still favorable, the exemplary method will defer writing the updated bucket back to the SQL server and rather elect to maintain it in memory. If future rows calling for updating the 'bob' bucket occur, the exemplary method then avoids the read from the SQL server thus improving performance. Even when flushing an index buffer cache is necessary to stay within its memory consumption bounds, the exemplary method will not necessarily release memory. Instead, it may rely on an SQL operating system to do so. When flushing its buffer caches to the SQL server, the exemplary maintenance method may convert all its strong references to weak references. Thus, if the SQL server operating system needs to reclaim the memory it can do so. However, if the SQL server operating system does not perform a garbage collection, then the buckets are still cached and ready for use. A slight modification of the standard least-recently-used algorithm may used to determine which index buffer bucket references are converted to weak references first. When a large bucket (e.g., a rid-list with more than about 2000 rids) has been updated in memory more than 10 times, it is favored in the first cache replacement. This may be implemented by setting and clearing a bit for that element.

When a special trace flag is passed to the component, an exemplary maintenance method may produce additional trace information to expose the flow of data and help debug or optimize the procedure. Trace information may include all the update operations that would be performed in the order received had caching not been enabled.

Several examples are described that refer to a reference table R, an index ETI, a copied reference table RC, an auxiliary table D_AUX and an auxiliary table I_AUX. Suppose R consists of a single column 'name' with the following data: 'nancy', 'nancy', 'nancy', 'bob', 'bob', 'bob', 'jim' and 'jim'. The corresponding RC would then have two columns 'rid', 'name' with the following data:

| 1  | 'nancy' |
|----|---------|
| 5  | 'nancy' |
| 3  | 'nancy' |
| 4  | 'bob'   |
| 6  | 'bob'   |
| 2  | 'bob'   |
| 10 | 'jim'   |
| 12 | 'jim'   |

The ETI at that stage would include various columns such as, for example, token, frequency, and rid-list:

| 'nancy' | 3 | 1; 3; 5  |
|---------|---|----------|
| 'bob'   | 3 | 2; 4; 6  |
| 'jim'   | 2 | 10; 12   |

The ETI typically includes other columns and rows for information such as, but not limited to, q-grams (see above) where an exemplary maintenance method may support q-grams and maintain them similarly to tokens.

Given the above data, suppose the following deletion is received: 'nancy', 'nancy' and 'bob'. An exemplary T-SQL trigger, in response to the deletion, fires and selects rids 1, 4, 5 from RC and stores them in D_AUX. The exemplary trigger then invokes an exemplary managed update module. The managed update module joins D_AUX with RC (see, e.g., transfer block 520, join block 772) and reads the first row: 1 'nancy'. The exemplary module then tokenizes the row to obtain the token 'nancy' (see, e.g., tokenization block 524) and updates the ETI (see, e.g., update ETI block 528) to include:

| 'nancy' | 1 | 3 |
|---------|---|---|

The exemplary module then processes the remainder of the affected rows, Finally, the T-SQL trigger causes the deletion on RC. Thus, at the completion of the operation, R contains: 'nancy', 'bob', 'bob', 'jim' and 'jim'. Further, RC contains

| 3  | 'nancy' |
|----|---------|
| 6  | 'bob'   |
| 2  | 'bob'   |
| 10 | 'jim'   |
| 12 | 'jim'   |

Yet further, the ETI rows above are now:

| 'nancy' | 1 | 5      |
|---------|---|--------|
| 'bob'   | 2 | 2; 6   |
| 'jim'   | 2 | 10; 12 |

Given the above data (e.g., prior to the deletion), suppose the following insertion occurs: 'nancy', 'nancy' and 'bob'.

An exemplary T-SQL trigger, in response to the change, fires and inserts the new rows into RC. The SQL server then automatically assigns rids to the new rows leaving RC with the following content:

| 1  | 'nancy' |
|----|---------|
| 5  | 'nancy' |
| 3  | 'nancy' |
| 4  | 'bob'   |
| 6  | 'bob'   |
| 2  | 'bob'   |
| 10 | 'jim'   |
| 12 | 'jim'   |
| 13 | 'nancy' |
| 14 | 'nancy' |
| 15 | 'bob'   |

The new rids 13, 14, 15 are placed in the I_AUX table. The T-SQL trigger then invokes an exemplary managed maintenance module. The module then joins I_AUX to RC, reads the rows, and processes them as described above. The resulting ETI has the rows:

| 'nancy' | 5 | 1; 3; 5; 13; 14 |
|---------|---|-----------------|
| 'bob'   | 4 | 2; 4; 6; 15     |
| 'jim'   | 2 | 10; 12          |

An exemplary maintenance method is optionally implemented in C# as a server-side SQL/CLR assembly loaded into a SQL server's resource database. Further, such a method is optionally exposed to fuzzy lookup-based applications in the form of three system stored procedures:

Sys.FuzzyLookupTableMaintenanceInstall
Sys.FuzzyLookupTableMaintenanceUninstall
Sys.FuzzyLookupTableMaintenanceInvoke Because these procedures are part of the sys.* schema, they are less susceptible to luring attacks because users cannot add to the sys.* schema. Luring attacks occur when a user calls a procedure without fully qualifying the name and inadvertently invokes a maliciously installed procedure.

When a user or an application wishes to signal to the server that a certain ETI should be maintained using an exemplary maintenance method, a table name is passed to Sys.FuzzyLookupTableMaintenanceInstall. Similarly, when maintenance is to be discontinued, the name is passed to Sys.FuzzyLookupTableMaintenanceUninstall.

An exemplary installation procedure establishes an ordinary T-SQL trigger on the reference relation R whose name is inferred from the ETI by examining SQL server extended properties placed on the ETI, for example, by a fuzzy lookup service at ETI construction time. Various pieces of metadata may be embedded in the ETI either as extended properties or in special metadata rows. The metadata may include the reference table name, tokenization characters, as well as the name of a reference table copy that a fuzzy lookup service may establish in order to add an integer identity column.

An exemplary maintenance method optionally, at the same time as the maintenance trigger, creates staging tables I_AUX, D_AUX for use in processing incoming insertions, deletions, and updates to R. Creation of the staging or auxiliary tables may occur via an exemplary installation procedure.

In instances where SQL server replication service is installed on the server, an exemplary maintenance method may elect to use the service to transfer data from R to RC rather than perform insertions or deletions directly.

While various Sys.* procedures are noted, other procedures may include a GenerateAndMaintainNewIndex procedure that installs one or more triggers on a reference table to synchronize an index table and the reference table. Again, to remove an installed trigger, a procedure such as FuzzyLookupTableMaintenanceUnInstall may be used where the name specified in a MatchIndexName (e.g., index table name) property is specified as an input parameter value.

In general, reference information that does not change may be referred to as "static", for example, consider a static reference table that cannot or has not received changes. In such instances, an exemplary fuzzy lookup package of services may disable various maintenance features associated with change information or may otherwise prevent such change information or instructions associated with change information from causing building of an index, etc.

As already mentioned, an exemplary method can maintain an index automatically wherein every time a change is to occur to reference information, the index is updated (e.g., a revised index built to the extend required). Maintaining the index in such a manner can save processing time, because the index does not need to be rebuilt when a fuzzy lookup is run. A facility may exist for a user to specify how maintenance of the index occurs (e.g., under what conditions, etc.).

A particular exemplary procedure, GenerateAndMaintainNewIndex, acts to build a new index, save it, and maintain it. Such a procedure may install one or more triggers on a reference table to keep the reference table and index table synchronized. Another exemplary procedure, GenerateAndPersistNewIndex, acts to build a new index and save it, but not to maintain it. Yet another exemplary procedure, GenerateNewIndex, builds a new index but does not save it. Such an option may be useful for testing. Another exemplary procedure, ReuseExistingIndex, acts to reuse an existing index. With respect to the various procedures that refer to a "new" index, such an index may be built incrementally to an extent required by any change information. For example, a block of change information may be used to build a new index to an extent required by the change information. Such a build is incremental with respect to an existing index and based on the change information. Such an incremental build (e.g., incremental based on change requests) does not generally require the computational demands needed to build an index from scratch.

As already mentioned, fuzzy lookup services are useful for performing data cleaning (DC) which is a rapidly growing subfield of data warehousing (DW). Other fuzzy lookup services include fuzzy grouping (FG) and the fuzzy segmentation components. Various exemplary technologies described herein are optionally implemented on a server (e.g., an SQL server). Various exemplary technologies optionally rely on object-relational SQL/CLR features of the Microsoft® SQL Server™ SQL Server 2005 software. Various exemplary technologies can make use of fuzzy lookup more efficient. In particular, the primary time-consuming procedure of using fuzzy lookup are constructing an index (e.g., ETI) and doing lookup against the index. In prior systems, any change to the reference table generally required re-building the entire index. Since fuzzy lookup is primarily useful for large reference tables, the building time can be a significant time and computational factor. Various exemplary technologies allow for use of fuzzy lookup without having to, at essentially the same time, build a fuzzy lookup index.

Various exemplary technologies decouple management or maintenance of a fuzzy lookup index from run-time use. In a corporate scenario, construction and maintenance of a fuzzy lookup index (e.g., ETI) may be done automatically or by someone other than the users of a client-side fuzzy lookup service. For instance, the index may represent sensitive corporate data residing on a restricted access server to which some employees may not have write privileges. In those cases, it is advantageous that some form of automatic maintenance be available so that client-side users are not dependent on an administrator or other entity to make updates before they can use "fresh" information (i.e., the most up to date information). This can also be useful in on-line scenarios where users may enter data and desire the data to be immediately accessible on a server through a fuzzy lookup service.

As already mentioned, an exemplary method can rely on a trigger that executes a script upon receipt of a request to change information. Execution of the script acts to build an index associated with a fuzzy lookup service. The extent of the build can depend on various factors. The build can occur incrementally on, for example, a change-by-change basis, to thereby avoid an entire build of an index (i.e., building an index from scratch, which can require substantial computational and memory resources); such a build may be referred to as an incremental build of the index to an extent required by the change information. Execution of the script can also allocate memory for processing the change and building the index, to the extent appropriate.

Exemplary Computing Environment

Figure 9:
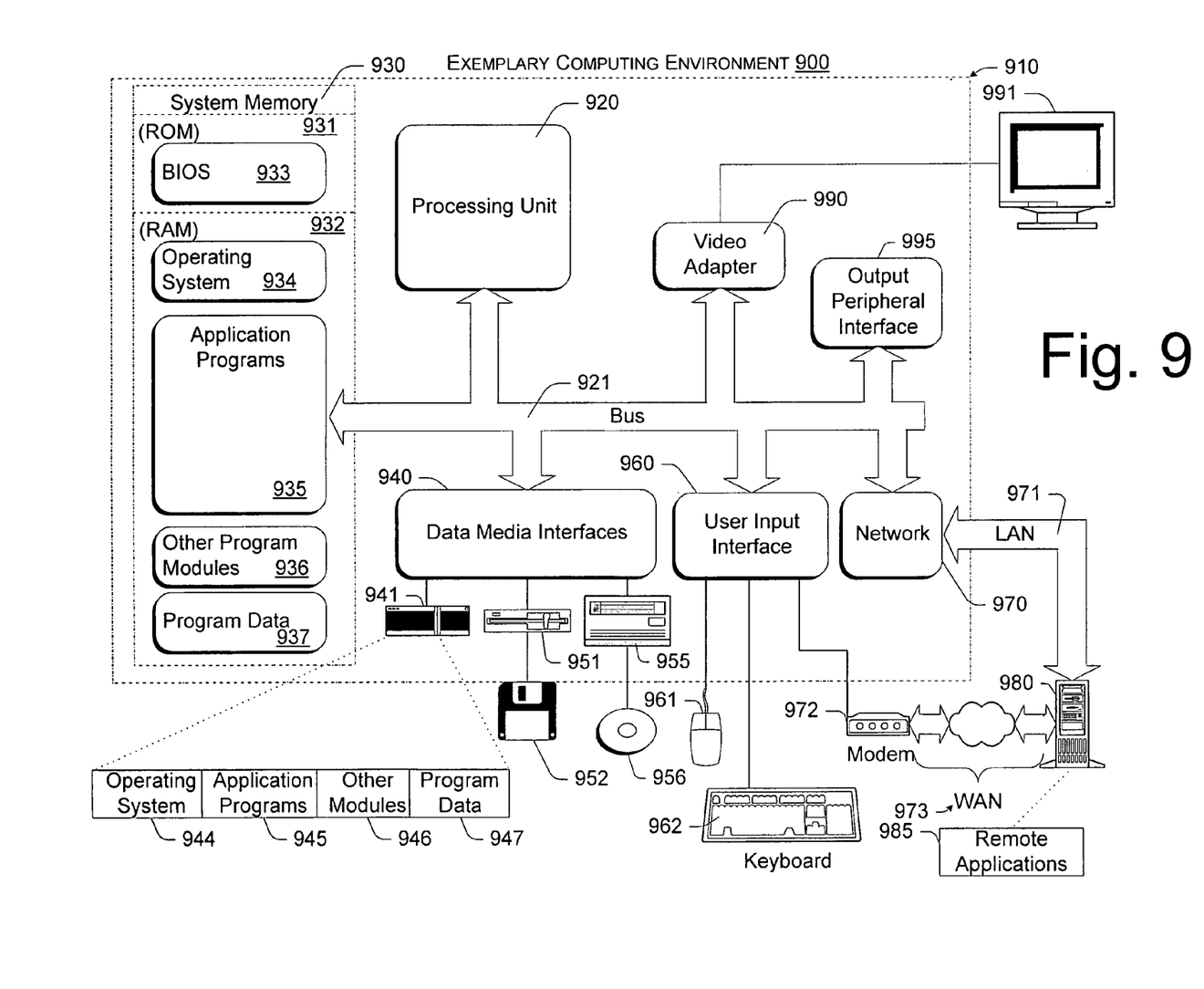
FIG. 9 is a diagram of an exemplary computing environment, which may be used to implement various exemplary technologies described herein.

The various exemplary technologies may be implemented in different computer environments. The computer environment shown in FIG. 9 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 9 illustrates an example of a suitable computing system environment 900 on which various exemplary methods may be implemented. Various exemplary devices or systems may include any of the features of the exemplary environment 900. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various exemplary methods, applications, etc., may be described in the general context of computer-executable instructions, such as program modules, being executed by a computer. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 9, an exemplary system for implementing the various exemplary methods includes a general purpose computing device in the form of a computer 910. Components of computer 910 may include, but are not limited to, a processing unit 920, a system memory 930, and a system bus 921 that couples various system components including the system memory 930 to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a data media interface such as interface 940, and magnetic disk drive 951 and optical disk drive 955 are typically connected to the system bus 921 a data media interface that is optionally a removable memory interface. For purposes of explanation of the particular example, the magnetic disk drive 951 and the optical disk drive use the data media interface 940.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 621 via an interface, such as a video interface 990. In addition to the monitor 991, computers may also include other peripheral output devices such as speakers and printer, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the features described above relative to the computer 910. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in a remote memory storage device. By way of example, and not limitation, FIG. 9 illustrates remote application programs 985 as residing on the remote computer 980 (e.g., in memory of the remote computer 980). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A computer-implementable method, implemented on one or more computing devices, comprising:
    providing a trigger that executes a script upon receipt of change information for changing reference information or an instruction associated with change information for changing reference information, the change information germane to an error tolerant index of a fuzzy lookup service;
    in response to execution of the script, allocating memory for processing the change information to thereby allow for maintaining the error tolerant index wherein the allocating allocates memory for a temporary delete table, a temporary insert table or for a temporary delete table and a temporary insert table;
    processing the change information using one or more of the temporary tables;
    based on the processing of the change information, tokenizing information in one or more of the temporary tables to allow for deletion, insertion or update of one or more tokens in the error tolerant index wherein the error tolerant index comprises a reference identification list and a frequency for each token; and
    maintaining the error tolerant index based on the tokenizing wherein the maintaining comprises deleting, inserting or updating one or more tokens and corresponding reference identification list, frequency or reference identification list and frequency in the error tolerant index.

2. The computer-implementable method of claim 1 wherein the building an index comprises an incremental build of the index to an extent required by the change information.

3. The computer-implementable method of claim 1 wherein the trigger comprises a T-SQL trigger.

4. The computer-implementable method of claim 1 wherein the trigger is associated with the reference information.

5. The computer-implementable method of claim 1 wherein the trigger comprises a T-SQL trigger associated with a reference table that includes the reference information.

6. The computer-implementable method of claim 1 wherein the instruction comprises an insert instruction or a delete instruction.

7. The computer-implementable method of claim 1 wherein the allocating the processing and the tokenizing comprise adaptive buffering.

8. The computer-implementable method of claim 1 wherein the allocating comprises estimating available memory of a sever.

9. The computer-implementable method of claim 1 wherein at least part of the processing occurs as a transaction.

10. The computer-implementable method of claim 9 wherein the transaction allows for performing a rollback procedure.

11. The computer-implementable method of claim 1 wherein the fuzzy lookup service relies on a probabilistic algorithm.

12. A T-SQL trigger, embodied in a computer-readable storage medium, associated with a SQL reference table comprising a script for causing allocation of memory and processing of change information for the SQL reference table wherein the script executes in response to the change information or an instruction associated with the change information wherein the script causes:
    allocation of memory for a temporary delete table, a temporary insert table or for a temporary delete table and a temporary insert table;
    processing the change information using one or more of the temporary tables;
    based on the processed change information, tokenizing information in one or more of the temporary tables to allow for deletion, insertion or update of one or more tokens in an error tolerant index, associated with the SQL reference table, wherein the error tolerant index comprises a reference identification list and a frequency for each token; and
    maintaining the error tolerant index based on the tokenizing wherein the maintaining comprises deleting, inserting or updating one or more tokens and corresponding reference identification list, frequency or reference identification list and frequency in the error tolerant index.

13. The T-SQL trigger of claim 12 wherein the instruction comprises an insert instruction or a delete instruction.

14. A computer-implementable method of maintaining an error tolerant index associated with reference information, the method implemented on one or more computing devices and comprising:
    providing a script that automatically executes upon receipt of change information or an instruction associated with change information; and
    in response to the execution of the script, maintaining the error tolerant index by:
    allocating memory for a temporary delete table, a temporary insert table or for a temporary delete table and a temporary insert table;
    processing the change information and the reference information using one or more of the temporary tables;
    based on the processed change information, tokenizing information in one or more of the temporary tables to allow for deletion, insertion or update of one or more tokens in the error tolerant index wherein the error tolerant index comprises a reference identification list and a frequency for each token; and based on the tokenizing, deleting, inserting or updating one or more tokens and corresponding reference identification list, frequency or reference identification list and frequency in the error tolerant index.

15. The computer-implementable method of claim 14 further comprising maintaining the reference information by creating a copy of the reference information and by processing the change information.

* * * * *